United States Patent
Toppare et al.

(10) Patent No.: US 8,013,109 B2
(45) Date of Patent: Sep. 6, 2011

(54) INDUSTRIALLY VIABLE METHOD FOR THE PRODUCTION OF POLYCARBYNES, POLYMERIC PRECURSORS TO DIAMOND AND DIAMOND LIKE CERAMICS

(76) Inventors: Levent Kamil Toppare, Ankara (TR); Michael Walker Pitcher, Ankara (TR)

( * ) Notice: Subject to any disclaimer, the term of this patent is extended or adjusted under 35 U.S.C. 154(b) by 423 days.

(21) Appl. No.: 12/280,173

(22) PCT Filed: Feb. 12, 2007

(86) PCT No.: PCT/TR2007/000012
§ 371 (c)(1),
(2), (4) Date: Aug. 21, 2008

(87) PCT Pub. No.: WO2008/010781
PCT Pub. Date: Jan. 24, 2008

(65) Prior Publication Data
US 2010/0063248 A1    Mar. 11, 2010

Related U.S. Application Data

(60) Provisional application No. 60/831,172, filed on Jul. 17, 2006.

(51) Int. Cl.
*C08G 61/02* (2006.01)
*C08G 61/04* (2006.01)
*H01M 8/04* (2006.01)
*H01M 4/00* (2006.01)

(52) U.S. Cl. ......... 528/397; 528/482; 528/488; 528/495

(58) Field of Classification Search ................. 528/397, 528/482, 488, 495
See application file for complete search history.

(56) References Cited

U.S. PATENT DOCUMENTS 5,436,315 A * 7/1995 Rieke ............................ 528/397
5,463,018 A * 10/1995 Rieke ............................ 528/373

OTHER PUBLICATIONS

International Search Report and Written Opinion for PCT/TR2007/000012.

* cited by examiner

*Primary Examiner* — Duc Truong
(74) *Attorney, Agent, or Firm* — Collen IP; Donald J. Ranft

(57) ABSTRACT

This invention is related to a new method of synthesizing polycarbynes. These polymers are known to produce diamond and diamond like ceramics upon heating, by plasma processing, and chemical vapour deposition.
The method of synthesizing polycarbynes is characterized by, Placing trihaloalkanes ($RCX_3$) or mixtures of them in any proportion, solvent (2) and electrolyte in a container (1), Application of electricity to electrodes (4) using a suitable power supply (3).

Figure 1:
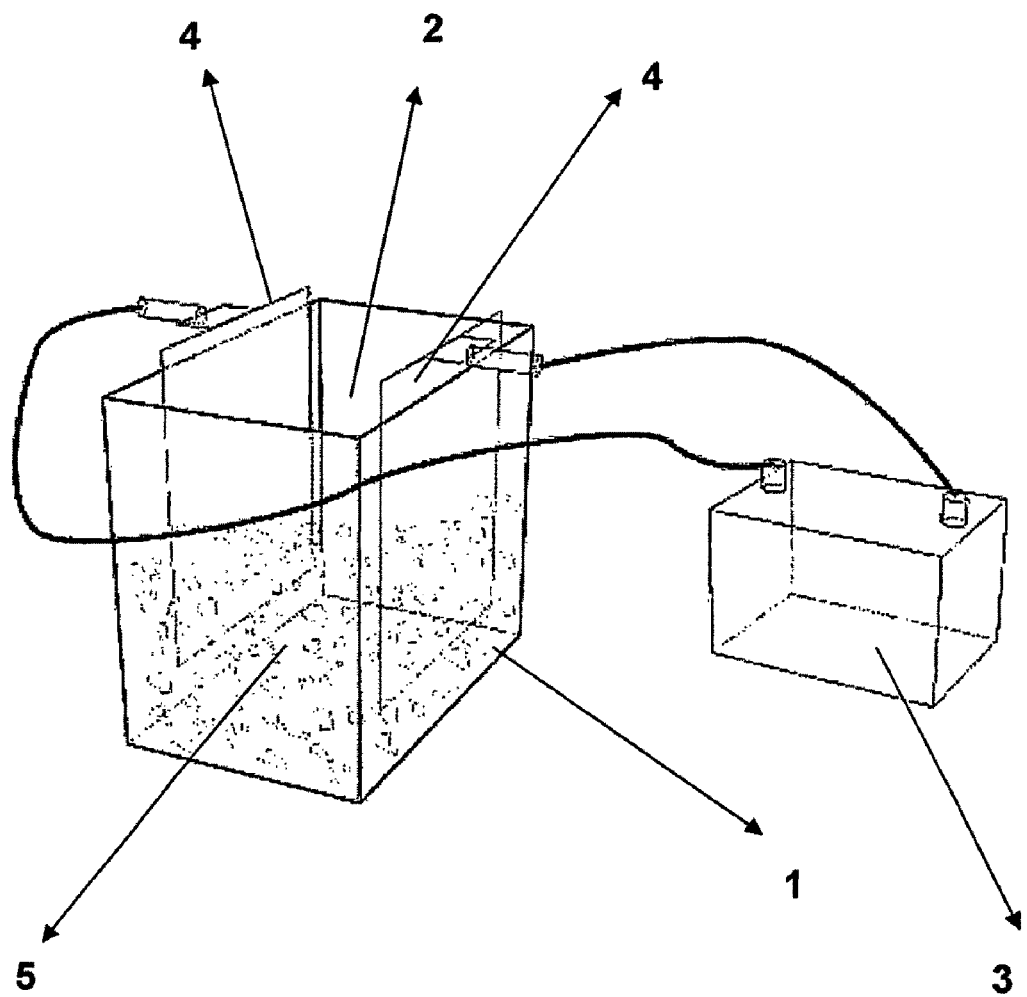

10 Claims, 5 Drawing Sheets

INDUSTRIALLY VIABLE METHOD FOR THE PRODUCTION OF POLYCARBYNES, POLYMERIC PRECURSORS TO DIAMOND AND DIAMOND LIKE CERAMICS

TECHNICAL FIELD OF INVENTION

This invention is related to a new method of synthesizing polycarbynes. These polymers are known to produce diamond and diamond like ceramics upon heating, by plasma processing, and chemical vapour deposition.

PRIOR ART

The only person to have synthesized the polycarbynes (diamond/diamond like ceramics) previously is Patricia A. Bianconi.

Bianconi and co-workers report in "Poly(phenylcarbyne): a polymer precursor to diamond-like carbon" (Visscher, Glenn T.; Nesting, David C.; Badding, John V.; Bianconi, Patricia A. Dep. Chem., Pennsylvania State Univ., University Park, Pa., USA. Science (Washington, D.C., United States) (1993), 260(5113), 1496-9) the first synthesis of a polycarbyne; a polymer that can be converted to diamond or diamond-like carbon (DLC). The unusual structure of the polymer, which consists of tetrahedrally hybridized carbon atoms, of which each bears a pendant phenyl group, that are linked to three other carbon atoms in a three dimensional network of fused rings, is the reason why it easily forms diamond with moderate heating and no applied pressure. The polymer is made by reducing a monomer with liquid sodium-potassium alloy (NaK) and high intensity ultrasound. Further discussion about the properties of the diamond/DLC produced from this polymer is contained in the publication "Diamond-like carbon bonds. Reply to comments" (Bianconi, Patricia A. Department of Chemistry, Pennsylvania State Univ., University Park, Pa., USA. Science (Washington, D.C.) (1994), 266 (5188), 1256-7) which is a reply to the comments of W. S. Basca about this original article.

Bianconi subsequently goes on to report the synthesis of different types of polycarbynes in the publication "Synthesis and characterization of polycarbynes, a new class of carbon-based network polymers." Visscher, Glenn T.; Bianconi, Patricia A. Dep. Chem., Pennsylvania State Univ., University Park, Pa., USA. Journal of the American Chemical Society (1994), 116(5), 1805-11. The polymers which were made were poly(phenylcarbyne) (I), poly(methylcarbyne), 75:25 poly(phenyl-co-methylcarbyne), and 99:1 poly(phenyl-co-hydridocarbyne) which were obtained by the reductive condensation of the appropriate $RCCl_3$ (R=Ph, Me or H) monomers in various ratios again with ultrasonically-generated emulsions of Na—K alloy in THF (tetrahydrofuran). Other miscellaneous co-polymers were also prepared. The unique structure of these polymers is again emphasized.

Evidence for this structure is also reported in two theoretical papers "Structural Analysis of Carbyne Network Polymers", Best, Scott A.; Bianconi, Patricia A.; Merz, Kenneth M., Jr. Department of Chemistry, Pennsylvania State University, University Park, Pa., USA. Journal of the American Chemical Society (1995), 117(36), 9251-8 and "Structural analysis of carbyne network polymers", Scott A.; Bianconi, Patricia A.; Merz, Kenneth M., Jr. Department Chemistry, Pennsylvania State University, University Park, Pa., USA. ACS Symposium Series (1995), 589(Computer-Aided Molecular Design), 304-15.

The last publication involving this class of polymer is "Diamond and Diamond-Like Carbon from a Preceramic Polymer", Bianconi, Patricia A.; Joray, Scott J.; Aldrich, Brian L.; Sumranjit, Jitapa; Duffy, Daniel J.; Long, David P.; Lazorcik, Jason L.; Raboin, Louis; Kearns, James K.; Smulligan, Stephenie L.; Babyak, Jonathan M. Departments of Chemistry and Polymer Science, University of Massachusetts at Amherst, Amherst, Mass., USA. Journal of the American Chemical Society (2004), 126(10), 3191-3202. In this report Bianconi discloses the synthesis of poly(hydridocarbyne), the latest in the class of carbon-based random network polymers (the polycarbynes). Structurally the polymer is the same as previous reports except now each carbon has a pendant hydrogen atom. This paper suggests the diamond or DLC which can be produced from this polymer should be produced in very high yield. Also the high $sp^3$ content of this polymer is emphasized meaning that high-quality diamond and diamond like material is produced.

Bianconi has also two patents related to these polymers. In the document WO/03/082763 having the title "Preparations of high or ultrahigh molecular weight inorganic or carbon polymers having backbone structures similar to polyacetylene" which has the priority dated 25 Mar. 2002 with the application number US 2002/000367592 and dated 05 Apr. 2002 with the application number US 2002/000370555 (published with the number US 2004/0010108 and US 2006/0106184), Bianconi, Patricia A. and Joray, Scott have disclosed "high and ultrahigh molecular weight (MW) homo- and copolymers having a three-dimensional random network structure. The polymers have recurring structural units of the general formula $[AR]_n$, wherein A can be carbon, silicon, germanium, tin atoms, or other elements and compounds. R can be the same as or different from A (in each repeating unit), and can be hydrogen, saturated linear or branched-chain hydrocarbons containing from about 1 to about 30 carbon atoms, unsaturated ring-containing or ring hydrocarbons containing from about 5 to about 14 carbon atoms in the ring, each in substituted or unsubstituted form, polymer chain groups having at least 20 recurring structural units, halogens, or other elements or compounds. The number "n" can be at least 20, and the high MW polymers have a molecular weight of at least 10,000 Daltons, e.g., about 30,000 Daltons, and as high as 1,000,000 or more Daltons"

In the document WO/95/24368 having the title "Preparation of polycarbynes and diamond-like carbon materials made from them", Bianconi, Patricia A. et al have disclosed "A polymer $[CR]_n$ [R=H, (substituted) hydrocarbyl, etc.] in which tetrahedrally hybridized C atoms are linked to each other by 3 C—C single bonds to give a 3-dimensional continuous random network backbone and 1 R group is linked to each C atom is prepared by reducing a monomer $RCX_3$ (X=Cl, Br, I) (e.g., $PhCCl_3$) with an emulsion of Na—K alloy and an organic solvent (e.g., THF) or by reacting $CX_4$ (e.g., $CBr_4$), an alkyl iodide (e.g., MeI), and Na metal. A polymer $[(R_1C)_x(R_2C)_y]_n$ [R=H, (substituted) hydrocarbyl, etc.] having a structure similar to that of the polymer $[CR]_n$ is prepared by reducing monomers $R_1CX_3$ and $R_2CX_3$ (e.g., $PhCCl_3$ and $MeCCl_3$) with an emulsion of Na—K alloy and an organic solvent. A polymer $[(R_1C)_x(R_2Si)_y]_n$ having a structure similar to that of the polymer $[CR]_n$ is prepared by reducing monomers $R_1CX_3$ and $R_2SiX_3$ (e.g., $PhCCl_3$ and $PhSiCl_3$) with an emulsion of Na—K alloy and an organic solvent. A polymer $[(R_1C)_x(R_2M)_y]_n$ (M=metal such as Ti or Hf) having a structure similar to that of the polymer $[CR]_n$ is prepared by reducing monomers $R_1CX_3$ and $R_2MX_3$ (e.g., $PhCCl_3$ and cyclopentadienyltitanium trichloride) with an emulsion of Na—K alloy and an org. solvent. The polymers are suitable for pyrolysis at 1000-1600 centigrade to give diamond-like carbon products, e.g., hard carbon coatings on substrates."

In all the above instances high intensity ultrasound and liquid NaK are used to synthesize these polymers; such a method is dangerous and unviable industrially.

In present and previous reports of the ceramic material produced from polycarbynes there is ambiguity in the terminology. Often the terms diamond, diamond-like carbon (DLC) and diamond-like material are used interchangeably. In this invention all of these terms are also used interchangeably to indicate any diamond or diamond like material which can be produced from the polycarbynes or their co-polymers.

AIMS OF THE INVENTION

The aim of the present invention is synthesize polycarbynes (diamond producing polymers) without the use of any explosive chemicals, ultrasound, etc. The method presented in this invention is simply based on using electricity.

DEFINITION OF FIGURES

In order to explain the present invention figures have been prepared and attached to the description. The list and definition of the figures are given below.

FIG. 1—Schematic view of the apparatus used for the synthesis of polycarbynes

Figure 2:
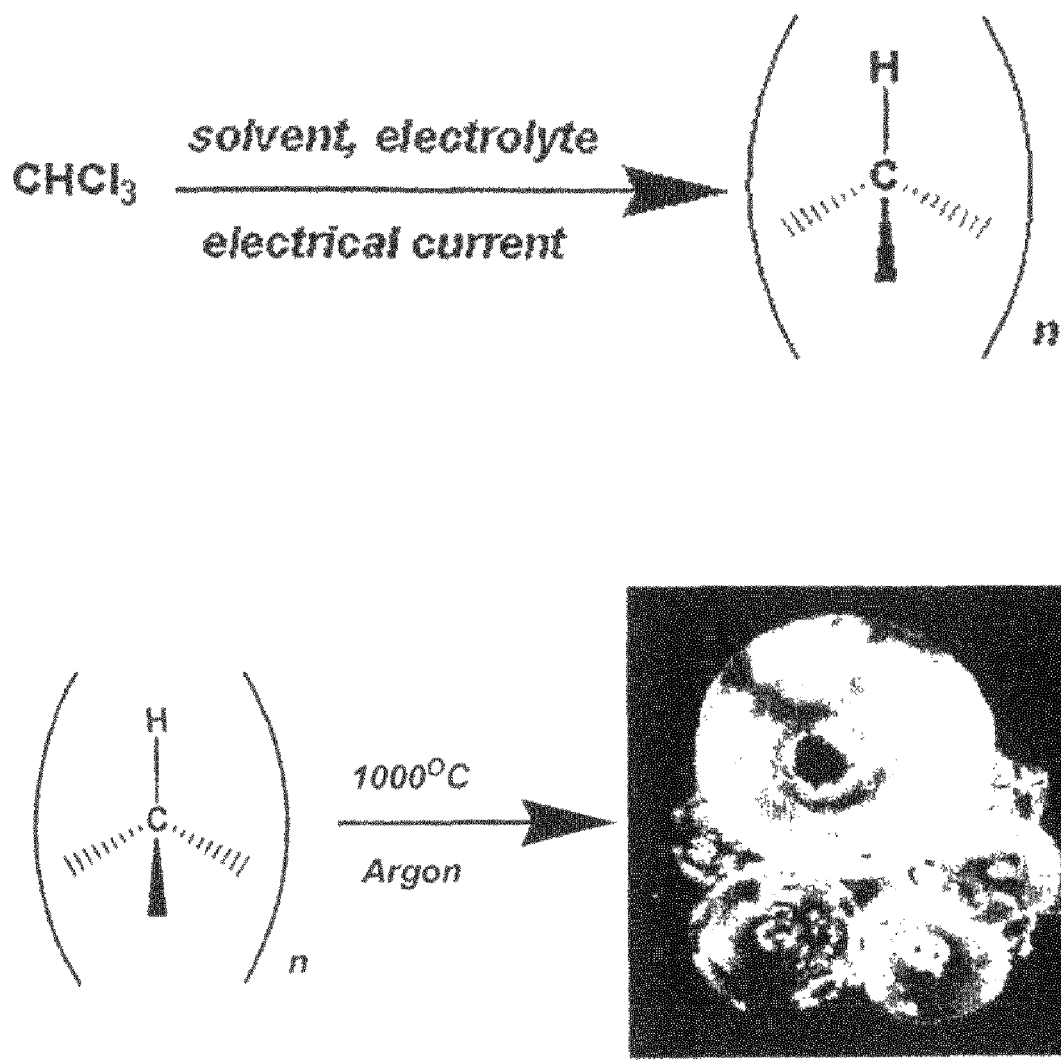
Figure 3:
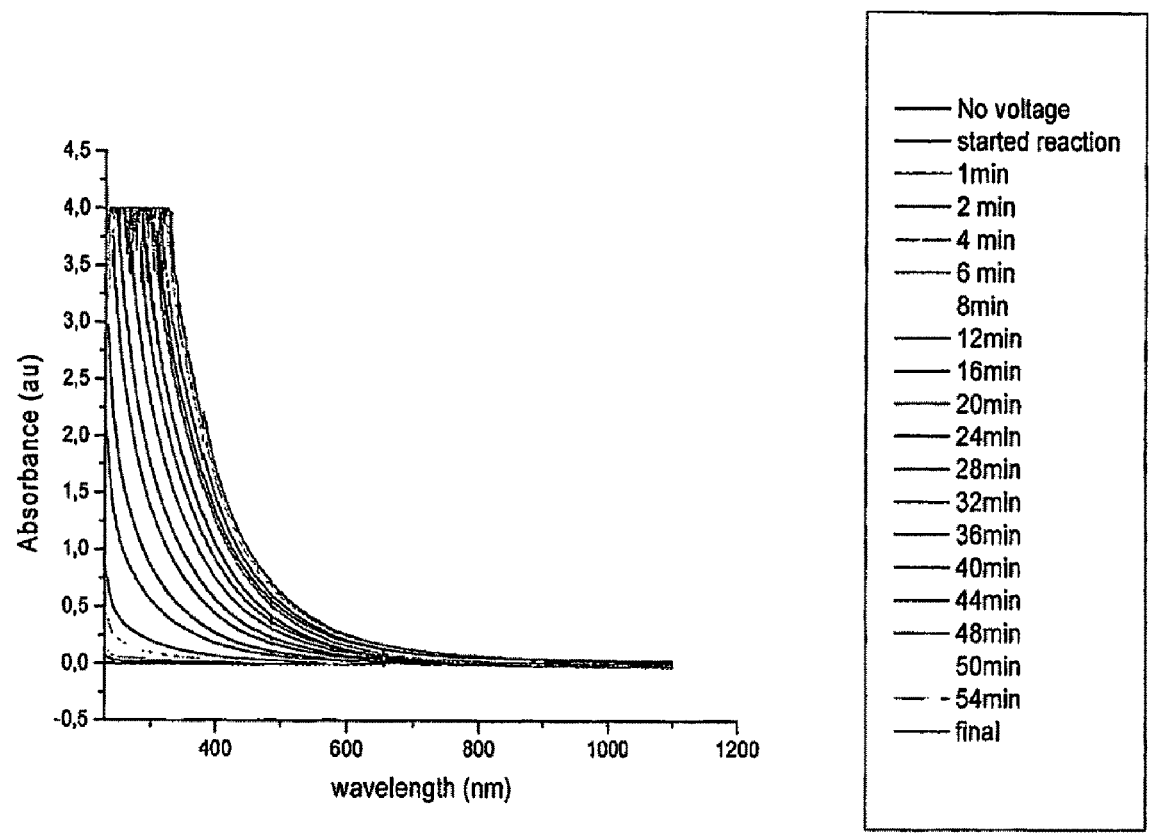
Figure 4:
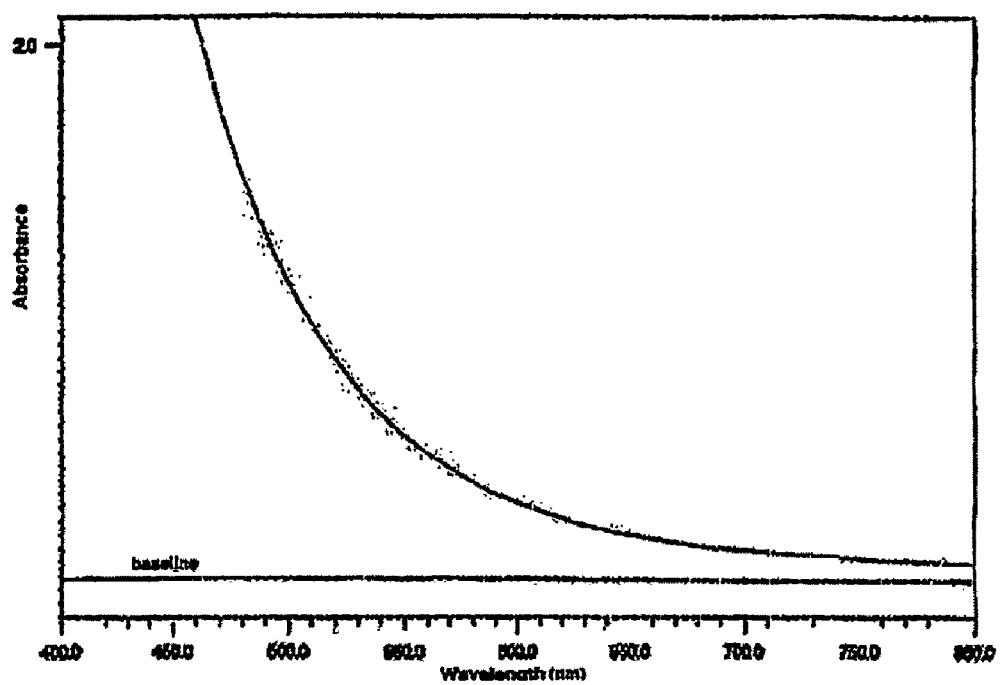
Figure 4:
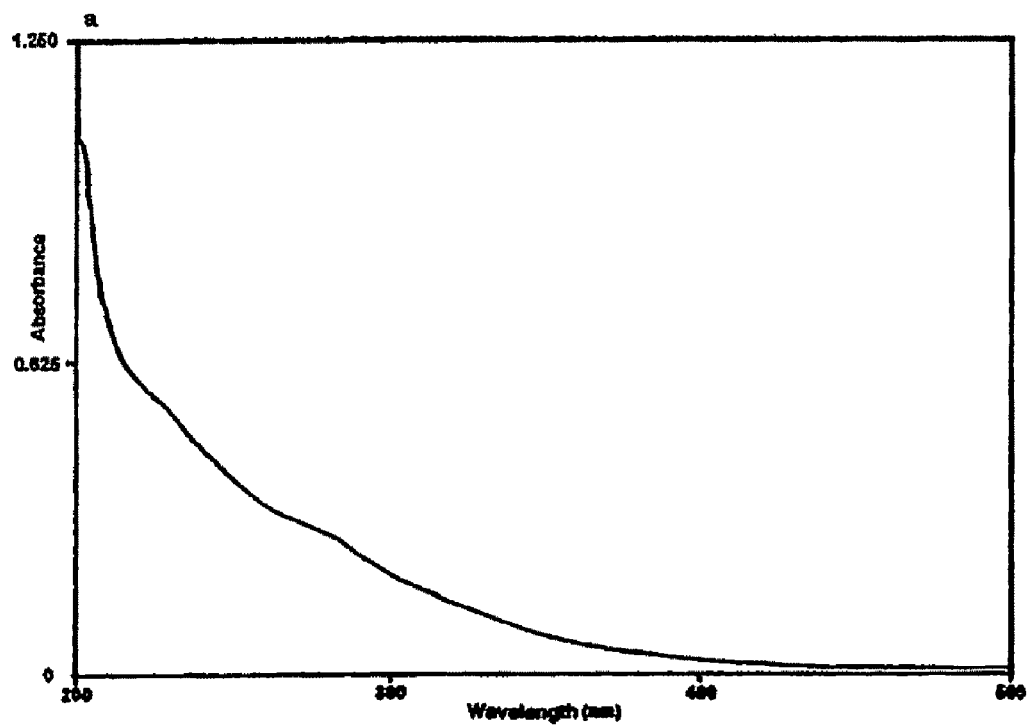

FIG. 2—Scheme showing the synthesis of poly(hydridocarbyne) and a method for producing diamond from it FIG. 3—UV/Vis spectrum obtained from the electro-polymerization of $HCCl_3$ (Scheme 1) over a one hour period FIG. 4: UV/Vis spectrum obtained from the polymerization of $HCCl_3$ obtained by Bianconi and co-workers [14]

Figure 5:
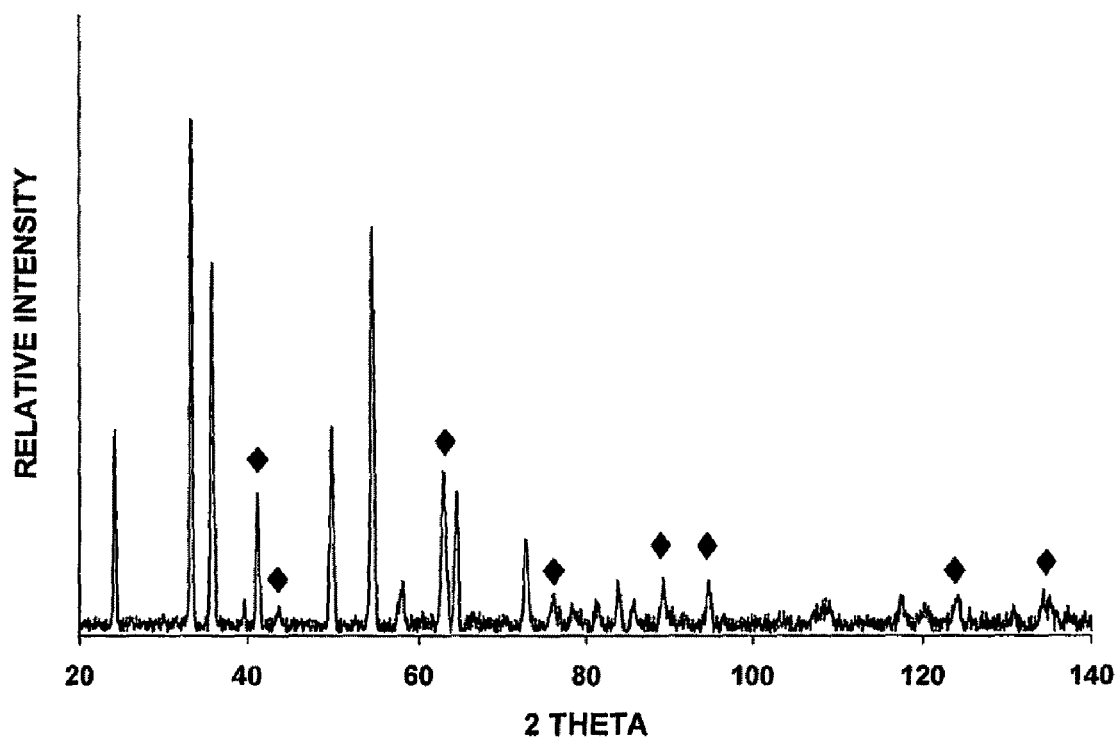

FIG. 5: XRD pattern of the diamond material obtained using the scheme in FIG. 2

DEFINITION OF FEATURES

In order to explain the present invention the features in the figures have been numbered and the definition or the numbers are given below.
1—Container
2—Trihaloalkanes ($RCX_3$) in a solvent with an electrolyte
3—Battery or any other electrical source
4—Electrodes
5—Polycarbyne polymer

BRIEF EXPLANATION OF THE INVENTION

The list of the references for explaining the importance of diamond, diamond producing polymers and both their uses are given below.
1—Austin, Gordon "Diamond/Industrial" American Ceramic Society Bulletin (1995), 74(6), 120-22
2—Klimenko, S. A.; Mukovoz, Yu. A.; Polonsky, L. G. "Cutting tools of superhard materials" Key Engineering Materials (1996), 114 1-66
3—Lettington, A. H. "Optical properties and applications of diamond and diamond-like carbon thin films" Proceedings of SPIE—The International Society for Optical Engineering (1990), 1275(Hard Mater. Opt.), 14-24
4—Franks, J.; Enke, K.; Richardt, A. "Diamond-like carbon-properties and applications" Metals and Materials (Institute of Materials) (1990), 6(11), 695-700
5—Mort, J. "Diamond thin films and their applications" Institute of Physics Conference Series (1990), 111(New Mater. Their Appl. 1990), 483-4
6—Lettington, Alan H. "Applications of diamond-like (hard carbon) films" NATO ASI Series, Series B: Physics (1991), 266(Diamond Diamond-like Films Coat.), 481-98
7—Grill, A.; Patel, V.; Meyerson, B. S. "Applications of diamond-like carbon in computer technology" Materials Science Monographs (1991), 73(Appl. Diamond Films Relat. Mater.), 683-9
8—May, Paul W. "Diamond thin films: a 21st-century material" Philosophical Transactions of the Royal Society of London, Series A: Mathematical, Physical and Engineering Sciences (2000), 358(1766), 473-495
9—Imai, Takahiro "Diamond as an electronic material" Materials Integration (2000), 13(3), 59-65
10—Okano, Ken "Doped diamond" Diamond: Electron. Prop. Appl. (1995), 139-74
11—Barnard, A. S.; Russo, S. P.; Snook, I. K. "Simulation and bonding of dopants in nanocrystalline diamond" Journal of nanoscience and nanotechnology (2005), 5(9), 1395-407
12—Shankar, P.; Buijnsters, J. G.; van Enckevort, W. J. P.; Schermer, J. J.; Raj, Baldev; ter Meulen, J. J. "Synthesis, characterisation and applications of CVD diamond films" Advances in Surface Treatment: Research & Applications (ASTRA), Proceedings of the International Conference, Hyderabad, India, Nov. 3-6, 2003 (2004)
13—Jeong, J.-H.; Kwon, D.; Lee, J.-K.; Lee, W.-S.; Baik, Y.-J. "Micromechanical analysis of residual stress effect in CVD-processed diamond wafer" Materials Research Society Symposium Proceedings (2000), 594(Thin Films—Stresses and Mechanical Properties VIII), 343-348
14—Bianconi, Patricia A.; Joray, Scott J.; Aldrich, Brian L.; Sumranjit, Jitapa; Duffy, Daniel J.; Long, David P.; Lazorcik, Jason L.; Raboin, Louis; Kearns, James K.; Smulligan, Stephenie L.; Babyak, Jonathan M. "Diamond and Diamond-Like Carbon from a Preceramic Polymer" Journal of the American Chemical Society (2004), 126(10), 3191-3202
15—Visscher, Glenn T.; Nesting, David C.; Badding, John V.; Bianconi, Patricia A. "Poly(phenylcarbyne): a polymer precursor to diamond-like carbon" Science (1993), 260 (5113), 1496-9
16—Schweitz, J.-A.; Larsson, K.; Thornell, G.; Bjorkman, H.; Nikolajeff, F. "New materials and new processes for MEMS applications" Materials Research Society Symposium Proceedings (2000), 605(Materials Science of Microelectromechanical Systems (MEMS) Devices II), 57-72
17—Catledge Shane A; Fries Marc D; Vohra Yogesh K; Lacefield William R; Lemons Jack E; Woodard Sharma; Venugopalan Ramakrishna "Nanostructured ceramics for biomedical implants" Journal of nanoscience and nanotechnology (2002), 2(3-4), 293-312.
18—Hirakuri, Kenji; Ohgoe, Yasuharu "Diamond-like carbon film coating. A long term use for artificial hearts" Materials Integration (2005), 18(6), 39-45

Diamond is an incredibly useful material [1]. It is the hardest naturally occurring mineral, so finds many applications in cutting, grinding and polishing due to it's superior wear resistance [2]. Its optical, electrical and thermal properties mean that it is a highly sought after material for use in a range of electronic devices [3-9]; especially now that it has been shown that it can be both p-doped an n-doped [10,11]. The problem however is that diamond is an inherently difficult to material to work with, especially if a particular shape is required e.g a fiber or a film or one tries to incorporate it into electronic devices where miniaturization is increasingly the name of the game. Chemical Vapor Deposition (CVD) is a partial solution in the formation of diamond films. Many ways have been discovered to achieve this but the process is expensive. Another drawback is that that the diamond films that are deposited by CVD are not smooth or continuous enough [12,13] for uses in electronics, or as coatings in Microelectromechanical Systems (MEMS). There are also issues with the purity of the diamond film that is deposited; most imagined applications of diamond require a very pure final product. CVD will therefore never be commercially viable for many anticipated uses of diamond films and is useless in producing other desirable diamond objects like fibers or filaments.

These limitations and problems are easily overcome if a move is made to a polymeric system that upon moderate heating in an argon atmosphere produces diamond like material. With such a system films, fibers and coatings of any size or shape can be produced easily and quickly. Such polymers do exist (they are called polycarbynes) and the material that is produced from them can be thought of as diamond [14,15] or diamond like carbon (DLC). The problem is that to synthesize them requires high intensity ultrasound, sodium-potassium alloy (NaK) and the final product is produced in very small quantities. These facts coupled with the knowledge that NaK is pyrophoric and extremely dangerous (indeed a quote from the most recent paper on these types of polymers reads "Caution! NaK alloy is pyrophoric and can be explosively reactive, especially with water and halocarbons. Handle with all necessary precautions and in inert atmospheres only") means that industrially this incredibly useful polymer will never be produced and its myriad of potential uses never realized.

These polymers have been produced in this invention by an incredibly easy method using chemistry that is available in every country in the world, rich or poor. Upon heating the material that is produced from their polymer has the same composition as previously reported diamond producing polymers [14,15]. Instead of using explosive reducing agents to produce the polymer, in the present invention simply electricity is used, this means that the synthesis is cheap and easy. It should be stressed that this has NOT been achieved before. The production of these class of polymers (the polycarbynes) using electricity is the main feature of this invention. The general scheme is:

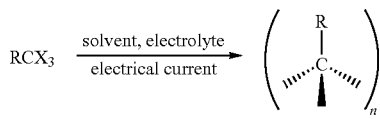

R = alkyl, H
X = Halogen

DETAILED EXPLANATION OF THE INVENTION

The general method for synthesizing the polycarbyne polymers is to place trihaloalkanes ($RCX_3$) in a solvent with an electrolyte and apply electricity.

A general view of the apparatus which can be used for the implementation of the present invention is given in FIG. 1. The size of the container and the electrodes can vary according to needs. The method developed in this invention is implemented as follows trihaloalkanes ($RCX_3$) or mixtures of them in any proportion, solvent (2) and electrolyte are placed in a container (1), Electricity is applied to electrodes (4) using a suitable power supply (3), Polycarbynes, which can be converted to diamond or diamond like ceramics,(5) are obtained.

In the implementation of the present invention,

All kinds of trihaloalkanes ($RCX_3$) or mixtures of them in any proportion can be used. The preferred trihaloalkanes ($RCX_3$) are chloroform, bromoform, trichlorotoluene . . . . etc The solvent can be selected from a range of organic solvents such as acetonitrile, tetrahydrofuran and alcohols.

The electrolyte can be simple salts like sodium chloride, as well as complex ones such as alkyl ammonium salts.

Electricity applied to electrodes can be DC or AC. However DC is preferred.

Electricity applied to electrodes is in the range of 3 to 7 Volts. The reaction does not start below 3 volts, whereas voltages above 7 volts cause the decomposition of the solvents and the electrolytes.

A specific example of the synthesis that was accomplished in this invention and some of the characterization data is illustrated below and in the subsequent pages:

A 1.2 M chloroform ($CHCl_3$) solution (in acetonitrile (AN)) was electrolyzed in the presence of 0.1 M tetrabutylammonium tetrafluoroborate (AN solution). 150 mL of the electrolyte-solvent couple was placed in a cell equipped with a 430 stainless steel cathode (10 cm×8 cm×0.5 mm) and anode (10 cm×8 cm×0.5 mm). Electrolysis was run at −6.0 V for 4 hours, at room temperature, under a $N_2$ atmosphere. The polymerization reaction was monitored using an ultraviolet (UV)/visible (Vis) spectrometer (FIG. 3). The polycarbynes have a unique UV/Vis spectrum [14] and FIG. 3 shows the development of this spectrum over a one hour time period. The spectrum is identical to that obtained by Bianconi and co-workers (FIG. 4). After electrolysis, two different work-up procedures were carried out. The first work-up procedure was performed on the solution which had been electrolyzed. Firstly, the solution was filtered, and then the AN was evaporated and a brown powder, which is poly(hydridocarbyne), was obtained. Tetrahydrofuran (THF) (which had been dried over sodium and benzophenone) was then used to dissolve the polymer and the solution was reacted (12 hours reflux) with $LiAlH_4$, which was used to remove any remaining halogen from the polymer. The THF was then evaporated and $CHCl_3$ used as solvent to dissolve the polymer and isolate it from any unwanted material.

A representation of this synthesis and its subsequent conversion into diamond/DLC is shown in the Scheme below and FIG. 2.

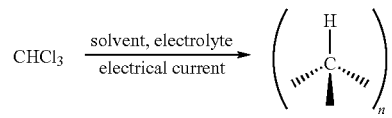

The isolated material was shown to be a polymer by GPC (Gel Permeation Chromatography) analysis. As mentioned previously, this polymer is a polycarbyne which indicated by UV/Vis spectrometry. Additional analysis by $^1H$ NMR (Nuclear Magnetic Resonance), $^{13}C$ NMR, Raman and FTIR (Fourier Transform Infrared) spectroscopy's also confirms the product to be a polycarbyne, [$(RC)_n$]. The second part of the work-up was done to separate the thick insoluble polymer deposited on the cathode. This coating was vigorously washed with AN to remove any unreacted monomer and supporting electrolyte, and the dried under vacuum.

AN and $CHCl_3$ were purchased from Merck and tetrabutylammonium tetrafluoroborate was obtained from Aldrich. All chemicals were used as received. It should be noted that although the inventors report here the synthesis of poly(hydridocarbyne), initial data from recent experiments have shown that this method can be used to synthesize other polycarbynes, such as poly(methylcarbyne) and poly(phenylcarbyne), which have also been shown to be precursors to diamond and diamond-like carbon.

Heat treatment of the polymer was carried out using a Thermolyne tube furnace fitted with an alumina tube under a constant flow of Argon. The sample was heated to 1000° C. at a ramp rate of 10° C./min, held for 24 hours and then cooled to room temperature. The material obtained was analyzed by optical microscopy and XRD (X-Ray Diffraction). Both to the naked eye and under an optical microscope transparent material which refracts light like gem quality diamond is clearly seen. The x-ray powder pattern (FIG. 5) of this mixture shows it to consist of lonsdaleite (a hexagonal form of diamond—indicated by ♦ symbols in the figure); there are also some peaks which the inventors have been unable, to date, to identify.

As a demonstration of ultimately how simple this synthesis could, the inventors set up an experiment with the most rudimentary sources of both electricity and an electrolyte that the inventors could find; namely a series of four 1.5 volt batteries and common table salt (10 mg). Using acetonitrile (3 mL) as the solvent, stainless steel electrodes and 0.5 mL of water the inventors polymerized chloroform (2 μL). The reaction was again followed by UV/visible spectroscopy. The resulting spectrum and the brown color of the material produced confirm the formation of poly(hydridocarbyne). The facile experimental set-up indicates that this amazing material could be produced by almost anyone. The results of this work demonstrate a cheap and simple method for producing a polymer which upon heating forms diamond. As the polymer is soluble the production of diamond objects of any shape is feasible. The straightforwardness and ease of the synthesis the inventors have developed will open up the production of this polymer, both on a commercial scale and in the laboratory, to scientists of all disciplines. Consequently the myriad of potential applications that are envisaged for this material might finally be realized.

As a summary, in the present invention, the method of synthesizing polycarbynes which upon heating and producing diamond and diamond like carbon, using electricity is developed. Application of a diamond or diamond-like carbon films from the liquid phase is currently not possible with any other diamond fabrication technique. It will allow for the conformal coating of previously impossible or inconvenient substrates, such as very large or complex shapes, MEMS [16], and electronic devices. The ease and simplicity of the technique will mean that this method might be cost effective for a wide variety of applications, even of large or low-cost items. And the simplicity and manipulability of this precursor will allow many fabrication options in new diamond-based electronic devices. It may even find utility in biomedical applications, which is a rapidly expanding area of use, for diamond and diamond-like materials [17,18].

The invention claimed is:

1. A method of synthesizing polycarbynes comprising the steps of:
   placing trihaloalkanes ($RCX_3$) or mixtures of them, solvent (2) and electrolyte in a container (1), and
   applying electricity to electrodes (4) in the container containing the trihaloalkanes $RCX_3$ or mixtures of them solvent 2 and electrolyte, the electricity being supplied using a suitable power supply (3).

2. The method of synthesizing polycarbynes as claimed in claim 1, wherein the trihaloalkanes ($RCX_3$) are chloroform, bromoform or trichlorotoluene.

3. The method of synthesizing polycarbynes as claimed in claim 1, wherein the solvent is an organic solvent.

4. The method of synthesizing polycarbynes as claimed in claim 1, wherein the solvent is acetonitrile or tetrahydrofuran.

5. The method of synthesizing polycarbynes as claimed in claim 1, wherein the solvent is alcohol.

6. The method of synthesizing polycarbynes as claimed in claim 1, wherein the electrolyte is a simple salt.

7. The method of synthesizing polycarbynes as claimed in claim 1, wherein the electrolyte is sodium chloride.

8. The method of synthesizing polycarbynes as claimed in claim 1, wherein the electrolyte is an alkyl ammonium salts.

9. The method of synthesizing polycarbynes as claimed in claim 1, wherein the electricity being applied to the electrodes is DC electricity.

10. The method of synthesizing polycarbynes as claimed in claim 9, wherein the electricity being applied to the electrodes is in the range of 3 to 7 Volts.

* * * * *